United States Patent
Vogt et al.

(10) Patent No.: US 10,048,353 B2
(45) Date of Patent: Aug. 14, 2018

(54) INTERFERENCE CANCELLATION IN AN FMCW RADAR

(71) Applicant: Robert Bosch GmbH, Stuttgart (DE)

(72) Inventors: Jingying Vogt, Munich (DE); Michael Schoor, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 364 days.

(21) Appl. No.: 14/895,810

(22) PCT Filed: Apr. 8, 2014

(86) PCT No.: PCT/EP2014/057019
§ 371 (c)(1),
(2) Date: Dec. 3, 2015

(87) PCT Pub. No.: WO2014/195046
PCT Pub. Date: Dec. 11, 2014

(65) Prior Publication Data
US 2016/0124075 A1  May 5, 2016

(30) Foreign Application Priority Data
Jun. 3, 2013 (DE) .................. 10 2013 210 256

(51) Int. Cl.
*G01S 13/34* (2006.01)
*G01S 13/38* (2006.01)
(Continued)

(52) U.S. Cl.
CPC ............ *G01S 7/023* (2013.01); *G01S 13/325* (2013.01); *G01S 13/343* (2013.01); *G01S 13/38* (2013.01);
(Continued)

(58) Field of Classification Search
CPC ...... G01S 7/023; G01S 13/325; G01S 13/343; G01S 13/38; G01S 13/536; G01S 13/584;
(Continued)

(56) References Cited

U.S. PATENT DOCUMENTS

| | | | |
|---|---|---|---|
| 2008/0051080 A1* | 2/2008 | Walker | H04B 7/2041 455/427 |
| 2012/0001791 A1* | 1/2012 | Wintermantel | G01S 7/023 342/109 |

FOREIGN PATENT DOCUMENTS

| | | |
|---|---|---|
| CN | 101490578 A | 7/2009 |
| CN | 102576069 A | 7/2012 |

(Continued)

OTHER PUBLICATIONS

Luke HD: "Mismatched filtering of periodic quadriphase and 8-phase sequences" IEEE Transactions on Communications, Bd. 51, No. 7, Jul. 1, 2003, pp. 1061-1063.

*Primary Examiner* — Frank J McGue
(74) *Attorney, Agent, or Firm* — Norton Rose Fulbright US LLP; Gerard Messina

(57) ABSTRACT

A radar system for transmitting a FMCW radar sensor signal encompassing a series of frequency modulation ramps and phase-modulated with a first code sequence orthogonal to a respective other code sequence with which a time-synchronized transmitted signal of another FMCW radar sensor is phase-modulated; the radar echoes are phase-demodulated with a code sequence correlating with the first code sequence; and a distance and/or a relative speed of a localized object is identified from a Fourier analysis frequency spectrum, in a first dimension over sampled radar echo values of a frequency modulation ramp, and in a second dimension over the phase-demodulated sequence of radar echoes of the ramps of the transmitted signal; and a vehicle fleet radar system having an FMCW radar sensor in (Continued)

which a code set satisfying a code set orthogonality condition with a code set of a radar sensor of another vehicle is used for phase modulation/demodulation.

16 Claims, 7 Drawing Sheets

(51) Int. Cl.
    *G01S 13/536* (2006.01)
    *G01S 13/58* (2006.01)
    *G01S 13/87* (2006.01)
    *G01S 13/93* (2006.01)
    *G01S 7/02* (2006.01)
    *G01S 13/32* (2006.01)
    *G01S 7/35* (2006.01)

(52) U.S. Cl.
    CPC .......... *G01S 13/536* (2013.01); *G01S 13/584* (2013.01); *G01S 13/878* (2013.01); *G01S 13/931* (2013.01); *G01S 2007/356* (2013.01); *G01S 2013/9375* (2013.01)

(58) Field of Classification Search
    CPC ................ G01S 13/878; G01S 13/931; G01S 2007/356; G01S 2013/9375

USPC ........................................................ 342/13
    See application file for complete search history.

(56) References Cited

FOREIGN PATENT DOCUMENTS

| | | |
|---|---|---|
| DE | 10 100 417 | 7/2002 |
| DE | 10 2009 000468 | 8/2009 |
| DE | 10 2010 024328 | 12/2011 |
| DE | 10 2012 212888 | 1/2014 |
| JP | H08146126 A | 6/1996 |
| JP | 2000206227 A | 7/2000 |
| JP | 2008275382 A | 11/2008 |
| JP | 2009042061 A | 2/2009 |
| JP | 2009510410 A | 3/2009 |
| WO | WO 03/104833 | 12/2003 |
| WO | WO 2005/111655 | 11/2005 |
| WO | 2010/000252 A2 | 1/2010 |
| WO | WO 2010/012801 | 2/2010 |
| WO | WO 2010/115418 | 10/2010 |
| WO | WO 2013/156012 | 10/2013 |

* cited by examiner

INTERFERENCE CANCELLATION IN AN FMCW RADAR

FIELD OF THE INVENTION

The present invention relates to the identification of distances and/or relative speeds of objects using an FMCW radar. The invention relates in particular to an FMCW radar sensor, to an FMCW radar system having a first and at least one second radar sensor, and to a radar system for a vehicle fleet encompassing multiple FMCW radar sensors.

BACKGROUND INFORMATION

Radar sensors are used in motor vehicles, for example, to measure the distances, relative speeds, and azimuth angles of vehicles or other objects located in the area in front of the own vehicle.

In a frequency-modulated continuous wave (FMCW) radar sensor, the transmission frequency of a continuous radar signal is modulated in the form of ramps. A baseband signal is generated from a received signal by mixing with the transmitted signal, and is then evaluated.

FMCW radar sensors that operate according to the chirp sequence modulation method, in which the transmitted signal encompasses at least one sequence of identical frequency modulation ramps (chirps), are known. The modulation parameters, such as the ramp duration and frequency excursion, as well as the time interval between adjacent ramps of a sequence, are identical within a sequence. For example, firstly a separation of the radar objects in terms of their distances is accomplished by performing a first Fourier transform of the baseband signal for each of the individual frequency ramps of the transmitted signal. The spectra of the first Fourier transforms of the frequency ramps of a sequence are then used as an input signal for a second Fourier transform. In the second Fourier transform, a separation of the radar objects is thus accomplished in terms of their speeds, based on changes in phase positions over the sequence of radar echoes of the individual frequency ramps.

Patent document DE 10100417 A1 discusses a pulsed radar in which a transmitted signal is modulated in accordance with a pseudo-noise code by amplitude modulation, phase modulation, or frequency modulation. In a receiving branch, a modulation using a delayed code is accomplished. The distance of a target object is inferred based on the time delay from emission to reception of the radar pulses. Orthogonal codes, which are generated from the pseudo-noise code e.g. by counters and EXOR gates, are used in further receiving channels. The result is that in a context of overlapping sensing regions of respective sensors, only the corresponding sensors in a respective receiving channel can be evaluated.

Patent document WO 2010/115418 A2 discusses a radar system having two transmitting antennas disposed in one plane and at a defined lateral spacing and having a shared receiving antenna, in which system both transmitting antennas are operated simultaneously in accordance with a sequence of similar frequency ramps, in which context a switchable inverter randomly varies the phase of the signal of the first transmitting antenna by 0° or 180° from one ramp to the next. After a first discrete Fourier transform (DFT) over the sampled values of each frequency ramp, a second DFT is calculated over the ramp sequence, once with a phase correction and once without a phase correction, in order to obtain separate spectra for received signals deriving from the respective transmitting antennas, so as to recover azimuth information. If the number of ramps per sequence is 1,024, then in the spectrum of a received signal deriving from a transmitting antenna the signal deriving from the respective other transmitting antenna yields a noise approximately 30 dB below it.

SUMMARY OF THE INVENTION

A trend evident at present in the development of driver assistance systems and safety systems for motor vehicles is an increase in the number of radar sensors used in a vehicle. This increases the probability that a radar sensor will also receive an undesired interfering signal from another radar sensor of the same vehicle.

As radar sensors become increasingly widespread in motor vehicles, undesired reception of radar signals from other vehicles can also occur in specific traffic scenarios. In stop-and-go driving, for example, a rear radar sensor of a preceding vehicle could interfere with a front radar sensor of the vehicle behind.

An object of the invention is to provide an FMCW radar system, and an FMCW radar sensor having chirp sequence modulation, in which undesired signals of other radar sensors can be effectively suppressed.

One approach to the suppression of interfering signals of other radar sensors is to offset the center frequencies of the radar sensors. Due to the available bandwidth this is possible only to a limited extent, however, and results in deficiencies in distance separation capability.

A further approach is to recognize interference in the time signal of the radar sensor based on interpolation of the time signal, using the model assumption that only a small region of the time signal is disrupted. When short ramp durations are used or if multiple interfering signals occur simultaneously, however, recognition of the interference, and interpolation, are no longer possible.

The object is achieved according to the present invention by a radar system as described herein.

For example, as in the case of a conventional chirp sequence modulation, a Fourier analysis is performed in the form of a two-dimensional, two-step discrete Fourier transform. A first Fourier transform creates a coherent oscillation, corresponding to a distance-dependent signal component, within the radar echo of a frequency ramp by way of a peak in the one-dimensional spectrum. A second Fourier transform is executed over the one-dimensional (but in this case previously phase-demodulated) spectra of the first Fourier transform, and creates a coherent oscillation, corresponding to a Doppler component, over the radar echoes of the sequence of frequency ramps by way of the position of the peak in the spectrum of the second Fourier transform. The result of the two-dimensional Fourier transform is a two-dimensional spectrum that is discrete or gridded (i.e. divided into distance/speed cells). The phase demodulation may be accomplished by multiplying the one-dimensional spectra of the frequency ramps by the respective conjugated complex element of the code sequence used in the receiver. The second Fourier transform already contains the summation of the respective terms, and therefore supplies the value of the autocorrelation or cross-correlation as a factor of the amplitude in the corresponding distance/speed cell of the two-dimensional spectrum.

As a result of the phase demodulation according to the present invention, an output peak of a radar echo occurs after the second Fourier transform only if, after the phase demodulation, a coherent oscillation of the phase position of the radar echo over the sequence of frequency ramps is present. This condition is met by radar echoes whose transmitted signal was phase-modulated with the code sequence that correlates with the code sequence used for phase demodulation. Conversely, if the baseband signal of a radar echo contains a component of the at least one second radar sensor, the corresponding peaks obtained after the first Fourier transform then have, after phase demodulation, no coherence over the sequence of frequency ramps. The cross-correlation of the code sequences in this case yields a factor of zero.

It is particularly advantageous that thanks to the use of mutually orthogonal code sequences, very good (ideally, complete) suppression of interfering radar echoes from signals of the other radar sensor occurs even with relatively short code sequences.

The above-described use of orthogonal code sequences allows mutual interference to be suppressed in a context of time-synchronized phase modulation of two transmitted signals. Self-interference within a radar system of a vehicle having multiple radar sensors can thus be suppressed.

The object is further achieved by a radar system as described herein.

Separate processing of the radar echoes of the partial transmitted signals until a two-dimensional spectrum is identified corresponds respectively, for example, to the above-described evaluation steps.

As a result of the phase demodulation and summation of the two-dimensional spectra for the partial signals, an output peak of a radar echo occurs in the summed spectrum only when the separated spectra add up to a spectrum in which a coherent oscillation of the summed phase positions of the radar echoes over the sequences of frequency ramps is present. In the case of a useful signal, the sum of the autocorrelation functions for a time shift of zero is obtained in the addition result as a factor of amplitude in the corresponding distance/speed cell. In the case of an interfering signal, phase-modulated with a further code set, of the radar sensor of the other vehicle, the sum of the cross-correlation functions is obtained as a factor of the amplitude. In accordance with the code set orthogonality relationship, this sum is equal to zero regardless of the value of a time shift between the code sequences.

Thanks to the above-described use of code sets having code sequences that conform to the code set orthogonality relationship, mutual interference can be suppressed even if the phase modulation of two transmitted signals is not time-synchronized. External interference between radar sensors of two vehicles can thus be suppressed.

Further advantageous embodiments and refinements of the invention are described in the dependent claims.

Exemplifying embodiments are described in further detail below with reference to the drawings.

DETAILED DESCRIPTION

Figure 1:
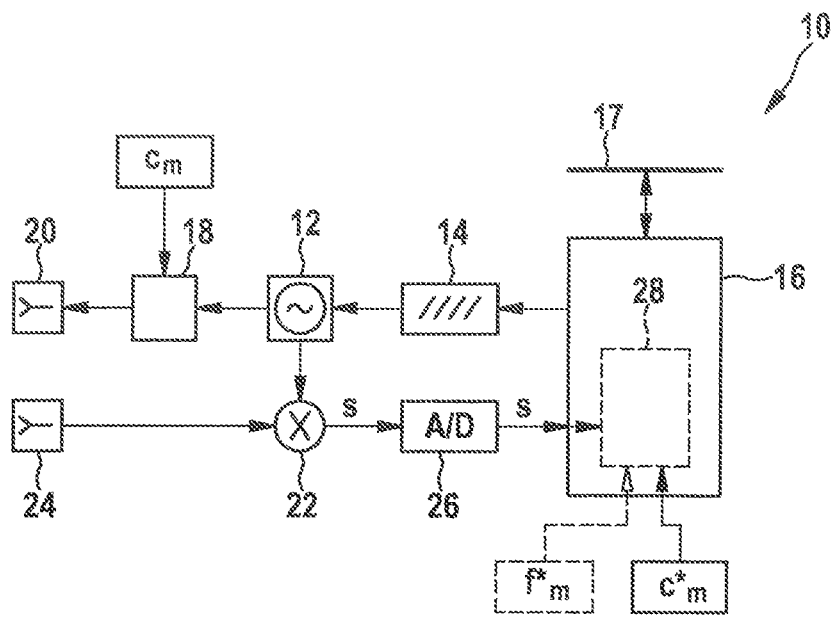
FIG. 1 is a block diagram of an FMCW radar sensor.

FMCW radar sensor 10 shown in FIG. 1 is installed in the front of a motor vehicle. It encompasses an oscillator 12 for generating a transmitted signal, a frequency modulation device 14 for controlling the frequency of oscillator 12, and a control and evaluation unit 16 that is connectable to a vehicle bus system 17. An output of oscillator 12 is connected via a controllable phase modulator 18 to a transmitting antenna element 20. An output of oscillator 12 is furthermore connected to a mixer 22. The latter is configured to mix a received signal received by a receiving antenna element 24 with the frequency-modulated signal of oscillator 12 in order to generate a baseband signal s. The baseband signal is sampled and digitized by an analog-digital converter 26. Mixing and digitization are performed while retaining the phase relationships between the received signal and the transmitted signal. Control and evaluation unit 16 controls frequency modulation device 14, and encompasses a signal processing unit 28 for evaluating the sampled values of the baseband signal s.

Figure 2:
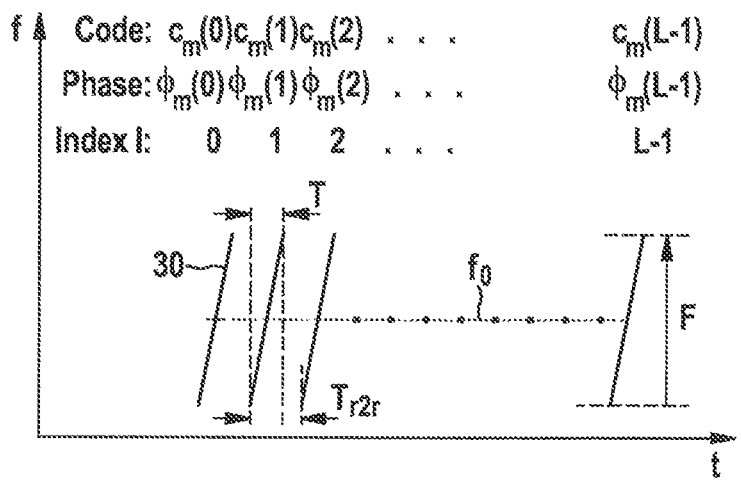
FIG. 2 schematically depicts a sequence of frequency modulation ramps of a transmitted signal.

FIG. 2 shows an example of a modulation pattern of the transmitted signal that is outputted from oscillator 12 and phase-modulated by phase modulator 18. The frequency f of the transmitted signal is plotted as a function of time t.

Frequency modulation device 14 is configured to modulate the signal of oscillator 12 in one measurement cycle, in accordance with a chirp sequence modulation, with at least one sequence of frequency ramps 30 following one another at regular time intervals, in particular a sequence of linear ramps of identical slope, identical center frequency, and identical excursion. The frequency modulation ramps are also referred to as "chirps," "frequency ramps," or simply "ramps." Phase modulator 18 is configured to modulate the phases of the chirps in accordance with a code sequence $C_m$, hereinafter also referred to as a "code" $C_m$. Each chirp within the sequence, having an index I where I=0 . . . L−1, receives a phase position in accordance with an associated element of the code sequence, in the form of a phase $\phi_m(I)$. This can be described as multiplication of the complex amplitude by the factor $C_m(l)=e^{j\Phi_m(l)}$, where j is the imaginary unit. The number of ramps of the sequence is equal to L, and is identical to the length of the code $C_m$.

Chirp sequence modulation and phase modulation are synchronizable by way of vehicle bus 17 with a modulation of a further radar sensor 10', so that for the respective sequences of the frequency ramp, or the respective code sequences, the time locations of ramps, or elements of the code sequence, that correspond to one another in the sequence have little or no time offset. The time offset is shorter than the duration of a ramp. The ramps, or elements of the code sequence, that correspond to one another in the sequence may be used in a manner that for the most part overlaps in time, particularly may be almost simultaneous (i.e. with complete overlap in time).

The center frequency of the transmitted signal is on the order of 76 gigahertz and the frequency excursion F of each ramp is on the order of a few megahertz. The ramp duration in FIG. 2 is shorter than the time interval $T_{r2r}$ at which ramps 30 succeed one another. $T_{r2r}$ is on the order of a few microseconds to a few milliseconds.

Figure 3:
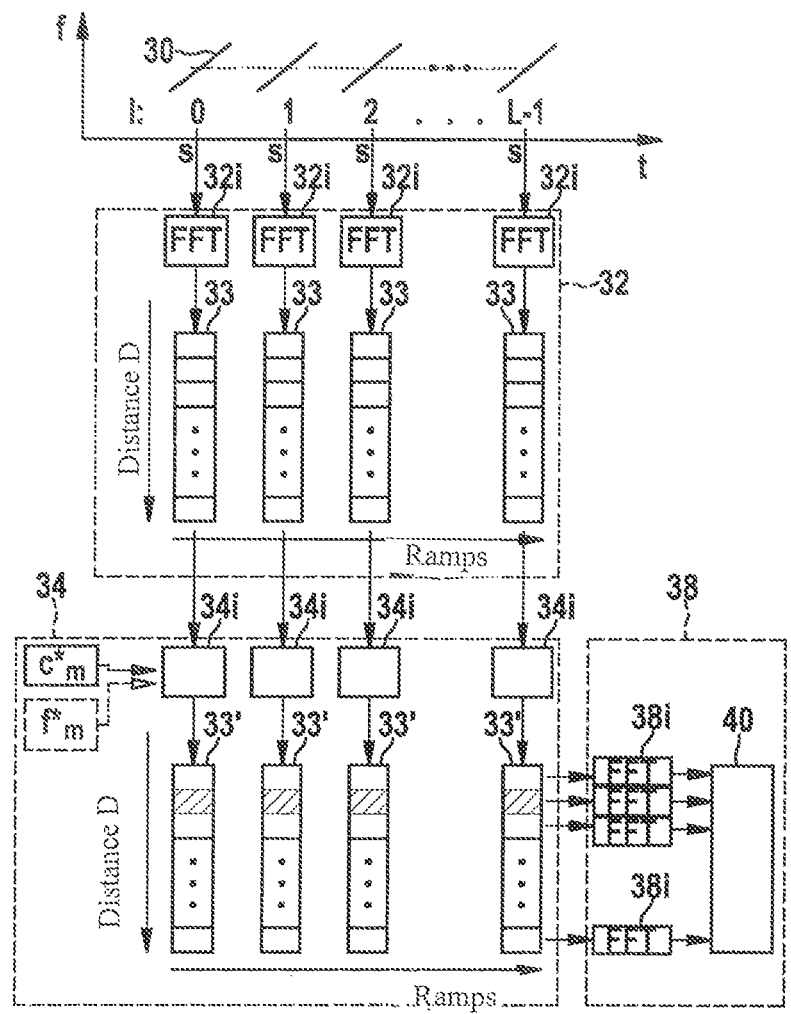
FIG. 3 is a block diagram to explain the evaluation of a baseband signal.

FIG. 3 is a block diagram of a method, implemented in signal processing unit 28, for evaluating the baseband signal s.

A first Fourier transform 32 is accomplished by respectively subjecting the partial signals of the baseband signal s, which correspond to the chirps, to a discrete Fourier transform 32i in the form of a fast Fourier transform (FFT) in order to identify a respective complex frequency spectrum 33. For a localized object, spectrum 33 contains a peak at a respective frequency position $f_d$.

For a constant relative speed v of the localized object, a harmonic oscillation of the phase of the peak occurs over the sequence of chirps 30. The oscillation's frequency $f_v$ is proportional to the average relative speed v. In addition, the signal within a ramp 30 exhibits the phase offset $\phi_m(l)$.

After the first FFT 32, the one-dimensional frequency spectra 33 are subjected to a phase demodulation 34 in which the phase offsets modulated onto the transmitted signal are demodulated by way of opposite phase offsets. For the ramp index I, a respective demodulation 34i is accomplished by multiplying the complex spectrum 33 by $C^*_m(l)$, the conjugated complex of $C_m(l)$.

A second Fourier transform 38 is performed, for example in the form of a respective FFT 38i that is executed for a respective frequency position, corresponding to a distance d, of the one-dimensional phase-demodulated spectra 33' over the running ramp index I. By way of example, the values of frequency spectra 33' belonging to one frequency position of frequency spectra 33' are depicted with hatching in FIG. 3.

At the frequency position $f_d$ of the first FFT, the frequency spectrum calculated with the second FFT exhibits the peak, associated with the respective object, at the Doppler frequency $f_v$ corresponding to a peak position $(f_d, f_v)$ in the resulting two-dimensional spectrum. Further evaluation and object detection are accomplished by a detection unit 40.

Alternatively, phase demodulation can already be accomplished before calculation of the first FFT 32. Serial succession of the first FFT 32 and second FFT 38 corresponds to a two-dimensional FFT of the phase-demodulated sequence of radar echoes.

Figure 4:
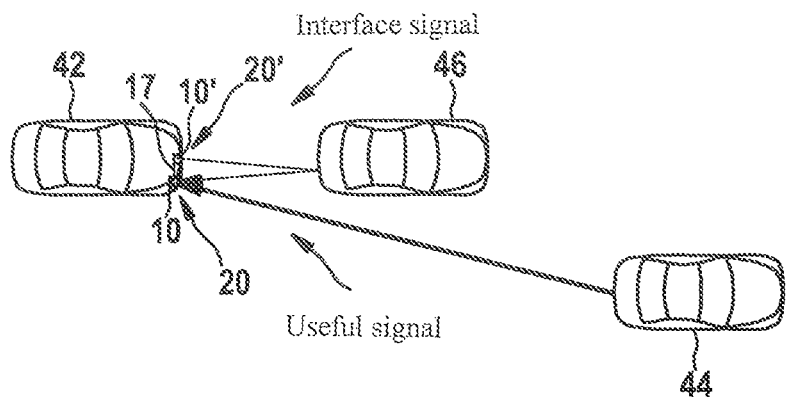
FIG. 4 schematically depicts a motor vehicle having an FMCW radar system in a situation with self-interference.

FIG. 4 shows an example in which, by the use of different code sequences of two FMCW radar sensors 10, 10' in one motor vehicle 42, self-interference in the form of an interference signal, which is received by one radar sensor 10 and derives from another radar sensor 10' having a transmitting antenna 20', is suppressed. Radar sensors 10, 10' have different installation locations and are, in particular, mounted separately on the vehicle.

In the example, a radar object 44 is located in an adjacent lane at a distance d=42 m and has a relative speed v=−7.6 m/s. An interfering signal from a second radar sensor 10' of the own vehicle is received from an object 46 at a distance of 3.32 m and having a relative speed of 0 m/s, for example a preceding vehicle. The transmitted signals, and in particular the ramp sequences, of radar sensors 10, 10' are synchronized with one another via an on-board vehicle bus system of motor vehicle 42.

First radar sensor 10 uses a code sequence $C_m$ for phase modulation; second radar sensor 10' uses a code sequence $C_q$ orthogonal thereto. The code sequences are hereinafter also referred to as "codes."

Codes are referred to as "orthogonal" when their cross-correlation function for a time offset equal to zero is zero, i.e. $r_{Cm,Cq}(0)=0$. The cross-correlation function for complex $C_m$, $C_q$ is defined as:

$$r_{Cm,Cq}(i) = \sum_{h=-\infty}^{\infty} C_m^*(h) \cdot C_q(h+i) \quad (1)$$

where the elements of the codes are defined as zero for indices outside the range 0, . . . , L−1, and where i is the time offset and corresponds to the difference in the indices of the values of the respective codes.

Hadamard codes can be used, for example, as orthogonal codes. Hadamard codes are binary codes in which the codes of a code set are made up of mutually orthogonal rows of Hadamard matrices. The elements of a code, also referred to as "code values," are limited to the values +1 and −1, corresponding respectively to phase offsets of 0° and 180°. In the case of a binary code, the elements of the code can each be defined by one bit.

For each ramp, the spectrum after the first FFT is multiplied by the conjugated complex of the associated element of the code sequence.

Because the duration of a ramp is very much longer than the transit time of the signal to a real target and back, the received signal can be regarded as synchronous with the transmitted signal, corresponding to a time offset of zero. This is referred to below as a "synchronization condition."

Once the second FFT over the ramp has been carried out, what results for the peak at the Doppler frequency $f_v$ is an amplitude that is proportional to the value of the cross-correlation function of the code being used, with a time offset of zero: $r_{Cm,Cm}(0)=L$. The correlation sum of the codes is equal to the code length L. This corresponds to synchronous multiplication of the two codes. Overall, as a result of integration of the first FFT over K samples per ramp and integration of the second FFT over the L ramps of a successor, the amplitude is greater by a factor KL than the amplitude of the received signal.

Conversely, when an interfering signal that was coded with the code $C_q$ is received by second radar sensor 10', what results after the first Fourier transform and phase demodulation with the code $C_m$, as a pre-factor of an amplitude of the second Fourier transform, is the cross-correlation function of the two codes for a time offset equal to zero: $r_{Cm,Cq}(0)$. The time offset here is equal to 0 when the synchronization condition is met and thus the signal deriving from the first ramp of radar sensor 10' is received together with the signal deriving from the first ramp of radar sensor 10. The interference is suppressed as a result of the orthogonality ($r_{Cm,Cq}(0)=0$) of the two codes. The correlation sum is zero.

In the example, an interfering signal is a signal deriving from radar sensor 10' and reflected from object 44. Interfering signals deriving directly from radar sensor 10' can, however, also be suppressed; these can correspond, for example, to an apparent object.

The situation shown in FIG. 4 will be described below by way of example with reference to a chirp sequence modulation having the following parameters for the ramp set: F=180 MHz, T=$T_{r2r}$=0.02 ms, and L=512, yielding a duration of the ramp set $T_{slow}$=10.24 ms. Each ramp is sampled at $N_{fast}$=512 points.

Figure 5:
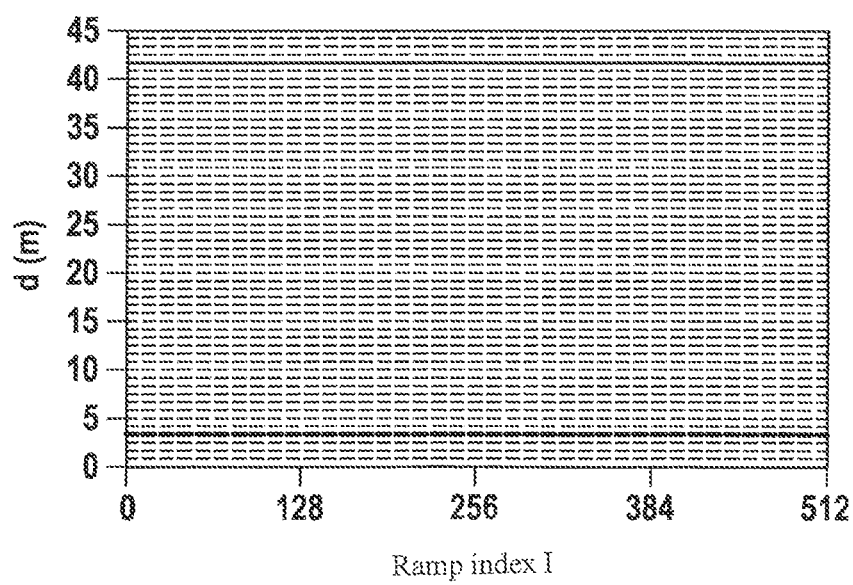
FIG. 5 is a diagram that shows distance information from partial signals of a baseband signal, to explain the evaluation according to FIG. 3.

Because the ramps are short and steep, the baseband signal is dominated by a ramp of the distance-dependent component of the frequency, so that the frequency spectrum of the first FFT of a partial signal corresponds to a resolution as to distances d. The amplitudes of the frequency spectra of the partial signals are schematically plotted in FIG. 5 as distance d against ramp index I. The estimated distance of the true target at d=42 m, and the distance of the interfering signal at a distance of 3.32 m, are marked.

The values of the complex amplitude at the frequency position corresponding to the distance d=42 m are phase-modulated over the sequence of ramps I with the code $C_m(I)$. The complex amplitudes at the frequency position of the interfering signal, however, are phase-modulated with the code $C_q(I)$.

Figure 6:
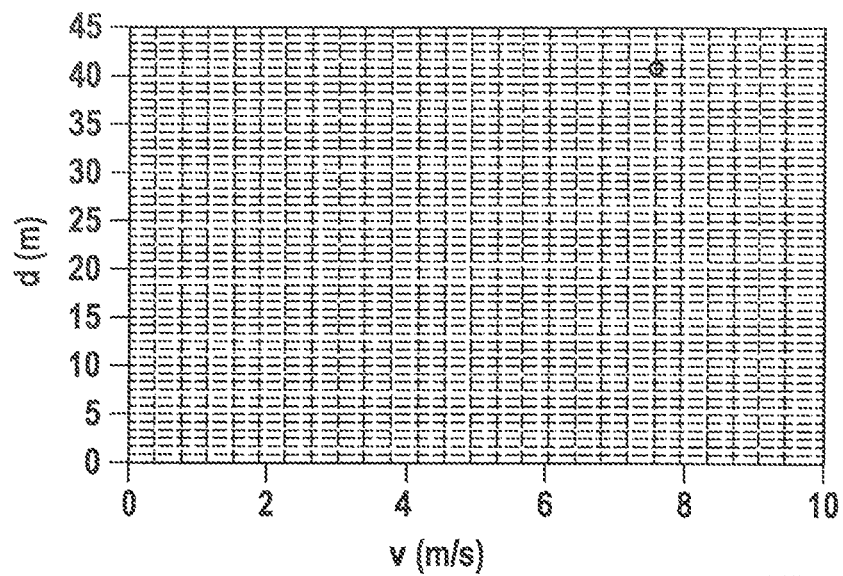
FIG. 6 is a diagram that shows speed and distance information from a signal profile over the partial signals, to explain the evaluation according to FIG. 3.

After phase modulation with the code $C_m$ and after the second FFT, the two-dimensional spectrum exhibits a single peak at the frequency position of the real object, corresponding to d=42 m and v=-6.7 m/s, as depicted schematically in FIG. 6. The value at the frequency position of the differential signal from the target having a distance of 3.32 m and relative speed 0 m/s is zero, however, since upon summation of the second FFT, the orthogonality of the codes that are used produces an amplitude of zero.

If the ramp time is short and the synchronization condition is not met, what results as a pre-factor of the interference signal after the second FFT is the cross-correlation function of the codes with a time offset not equal to zero. Said function is normally not zero. When two Hadamard codes having a code length L=512 are used, however, it is lower by an amount equal to $\log_{10}(1/512)=27$ dB than the pre-factor L=512 of the amplitude of the useful signal. The interfering signal is thus effectively suppressed even in the context of a small time offset that exceeds the length of a ramp.

An example of a radar system for a fleet of vehicles 42, 46 will be explained below with reference to FIG. 7 to FIG. 12; in this example, external interference in the form of an interfering signal that derives from another radar sensor 10' of another motor vehicle 46 is suppressed thanks to the use, in a radar sensor 10 of a motor vehicle 42, of code sets each having two code sequences.

Figure 9:
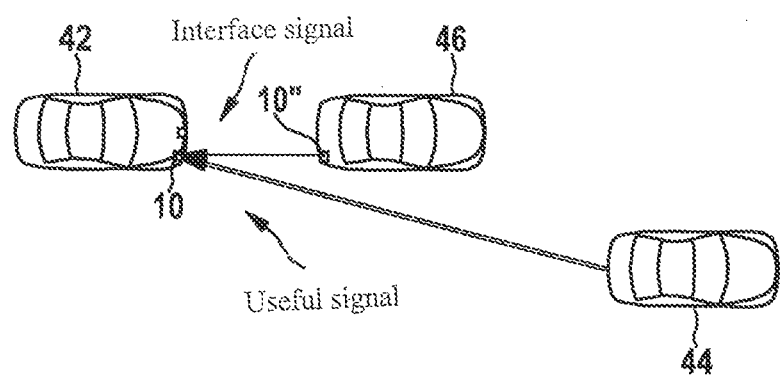
FIG. 9 schematically depicts a motor vehicle having an FMCW radar system, in a situation with external interference.

FIG. 9 schematically shows an example of a traffic situation in which a radar sensor 10 installed in a vehicle 42 receives a reflected signal from a real target 44 at a distance d=42 m and a relative speed v=-7.6 m/s. An interfering signal of a radar sensor 10' mounted at the rear of a preceding vehicle 46 is received from a distance of 1.66 m at a relative speed of 0 m/s.

Figure 7:
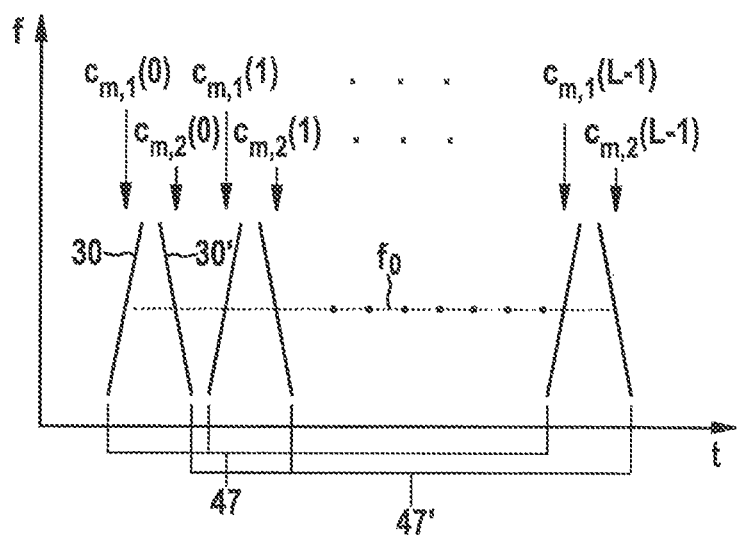
FIG. 7 is an exemplifying depiction of a transmitted signal having two partial transmitted signals in the form of a respective sequence of frequency modulation ramps, to explain a phase modulation when code sets having multiple codes are used.

FIG. 7 shows, for this instance, an example of a transmitted signal in which one measurement cycle encompasses two partial transmitted signals 47, 47' in the form of interleaved sequences of frequency ramps 30, 30'. The two sequences are also referred to hereinafter as "ramp sets" 47, 47'. Within the respective ramp set or partial transmitted signal 47, 47', the respective frequency ramps 30 and 30' have an identical ramp excursion, ramp slope, and ramp center frequency. The ramp sets can, for example, differ from one another in terms of a different ramp excursion, different center frequency, and/or different ramp slope. In the example shown, the ramp sets differ only in terms of the different sign of the ramp slope. The parameters of the frequency ramps correspond to the example above. Because of the interleaved ramp sets 47 and 47', however, now $T_{r2r}$=0.04 ms.

Each ramp set is phase-modulated with an associated code sequence of a code set, the code sequence of each frequency ramp of the sequence being associated with a phase offset. Ramp set 47 (ramps 30) is modulated with a code sequence $C_{m1}$, and ramp set 47' (ramps 30') is modulated with a code sequence $C_{m2}$.

The code set $C_m$, having codes $C_{m1}$ and $C_{m2}$, is selected from a code group that contains M code sets, each code set Q having codes of a length L, where Q corresponds to the number of ramp sets and is greater than or equal to 2; in the example, Q=2. The code group selected is one that possesses the property referred to as a "code set orthogonality condition" for all pairs of code sets Cm and Cq:

$$r_{Cm1,Cq1}(i)+r_{Cm2,Cq2}(i)+ \ldots +r_{CmQ,CcQ}(i)=0 \text{ for all } i=0, \ldots ,L-1. \quad (2)$$

Groups of code sets having this property are also referred to as "mutually orthogonal."

For illustration, an example will be given with L=16 and with a number M=2 of code sets C1, C2 each having Q=2 codes C11,C12 and C21,C22, respectively:

$$C11=(+1,+1,+1,-1,+1,+1,-1,+1,+1,+1,+1,-1,-1,-1,+1,-1)$$

$$C12=(+1,+1,+1,-1,+1,+1,-1,+1,-1,-1,-1,+1,+1,+1,-1,+1)$$

$$C21=(+1,-1,+1,+1,+1,-1,-1,-1,+1,-1,+1,+1,-1,+1,+1,+1)$$

$$C22=(+1,-1,+1,+1,+1,-1,-1,-1,-1,+1,-1,-1,+1,-1,-1,-1) \quad (3)$$

The code sets possess the property of mutual orthogonality:

$$r_{C11,C21}(i)+r_{C12,C22}(i)=0 \text{ for all } i. \quad (4)$$

An example where L=512 will be described below. The signal of radar sensor 10 is coded with the code set Cm. The signal of the external radar sensor 10' is coded with a code set Cq.

Figure 8:
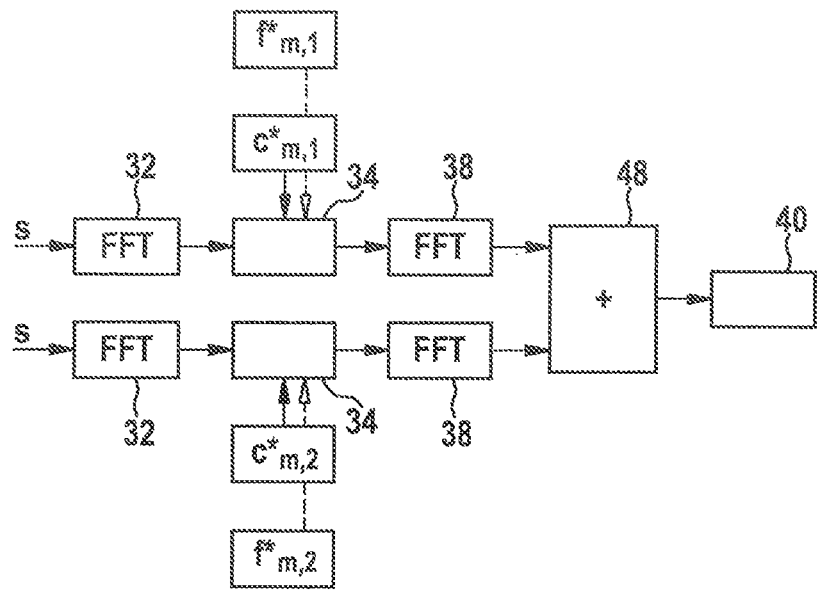
FIG. 8 is a block diagram to explain the evaluation of a baseband signal in the context of a transmitted signal having two ramp sets, for example as shown in FIG. 7.

The signals received for the two ramp sets 47, 47' are firstly processed separately in a respective channel, as depicted schematically in FIG. 8. The separation can be implemented, for example, by way of a time offset, different ramp parameters, and/or a polarization of the antennas used for the individual ramp sets. In the example, a time offset and a different slope, in the form of a different sign for the ramp slope, are used.

In the respective channel, the processing initially corresponds to the processing explained with reference to FIG. 3. First Fourier transform 32 is carried out. A code set that correlates with (here, for example, is identical to) the code set $C_{m1}$, $C_{m2}$ used for phase modulation is used for phase demodulation. Phase demodulation 34 is carried out by multiplying by the respective conjugated complex $C^*_{m,1}$ or $C^*_{m,2}$ of the respective code, and the second Fourier transform 38 is carried out over the ramps of the relevant ramp set.

In a summation 48, the resulting two-dimensional spectra of first ramp set 47 and of second ramp set 47' are added, and are transferred to detection unit 40 for further evaluation. Because the distance to a target changes by only a very small value during the time offset between ramp sets 47 and 47', the complex amplitudes are coherently added upon summation of the two-dimensional frequency spectra.

For the case of a real target, an amplitude that is proportional to the autocorrelation function of the respective code, with a time offset of zero, is obtained in the second FFT 38 at the frequency position of the target in the frequency spectra of the baseband signal. The correlation sum of the codes is therefore identical to the code length L for the respective ramp set.

After summation of the two-dimensional spectra of ramp sets 47, 47', a peak having the amplitude of the magnitude $2AN_{fast}L$ is obtained. The amplitude is thus proportional to a sum of the correlation sums of the codes of the code set.

At a frequency of the interfering signal of an external radar sensor which is coded with the code set $C_{q1}$, $C_{q2}$, however, what is obtained upon summing of the two-dimensional spectra is a respective amplitude that is proportional to the sum of the cross-correlation functions of the respective codes of the code sets, with a time offset that can be equal to or not equal to zero. Because of the property of mutual orthogonality in accordance with equation (2), this is always zero.

Figure 10:
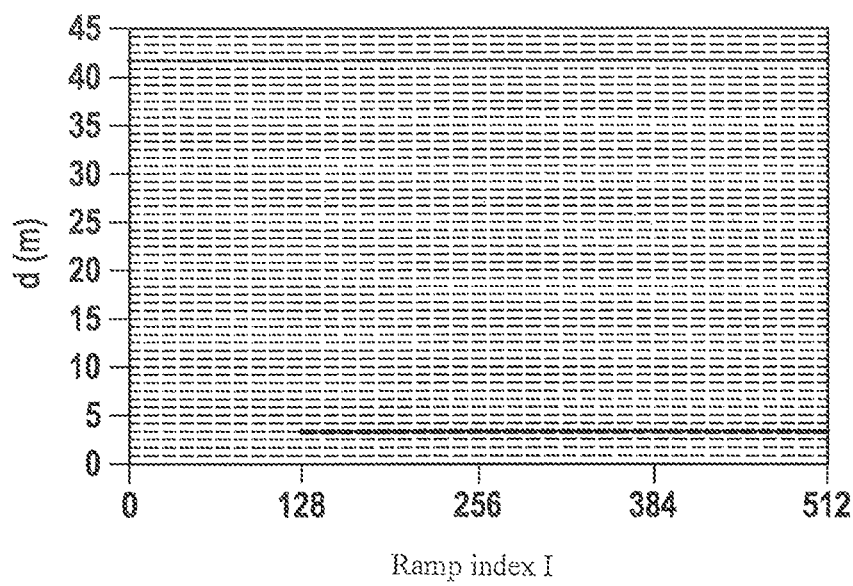
FIG. 10 is a diagram showing distance information from partial signals of a baseband signal in a ramp set, to explain the evaluation according to FIG. 8.

FIG. 10 shows the information regarding the distance d obtained from the first FFT, plotted schematically against the ramp index I of an individual ramp set 47, 47'. The signal of the external radar sensor is received by radar sensor 10 5.12 ms later than the radar echo of the target.

Figure 11:
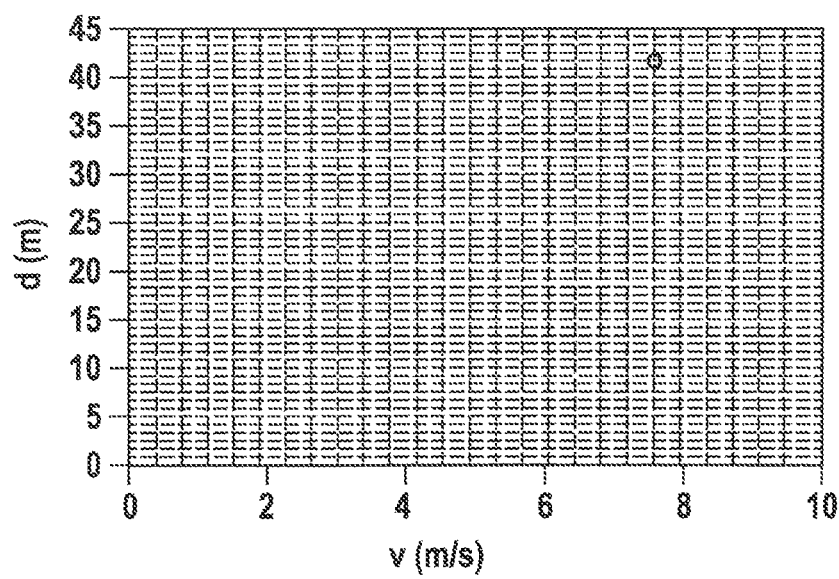
FIG. 11 is a diagram that shows speed and distance information from signal profiles over sequences of partial signals in a ramp set, to explain the evaluation according to FIG. 8.

The respective phase demodulations and the second Fourier transform 38 are then carried out for the frequency spectra of the respective ramp sets 47, 47'. A respective two-dimensional spectrum with respect to d and v, as shown in FIG. 11, is obtained for the two ramp sets.

Figure 12:
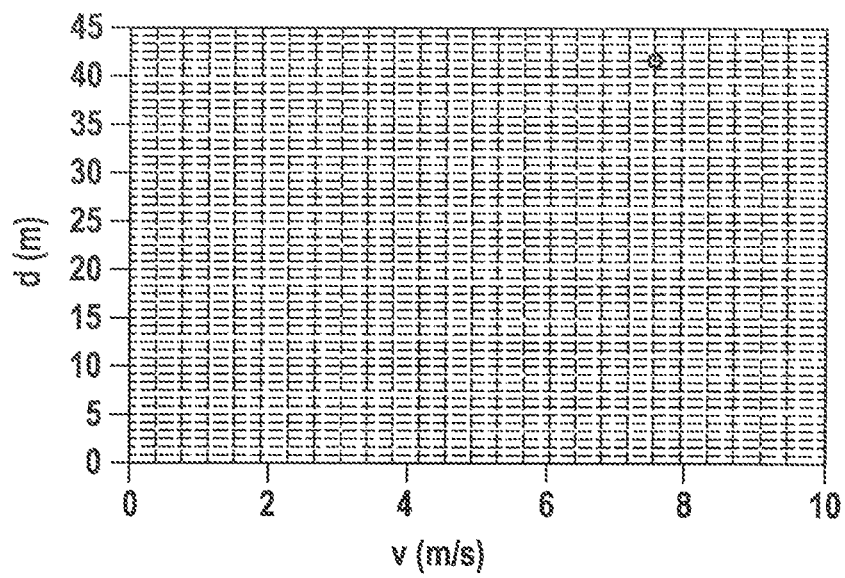
FIG. 12 is a distance/speed diagram after the summation of signal processing results for the two ramp sets, to explain the evaluation according to FIG. 8.

After summation of the spectra, a spectrum as shown in FIG. 12 is obtained. The amplitudes of the apparent target sum to zero. What results for the real target, however, because of the summation of the autocorrelation functions, is an amplitude $$2A_1 N_{fast} L e^{j\phi_{01}}. \quad (5)$$

in which $\phi_{01}$ is an offset that depends on the distance of the target.

In a variant of the above-described method with mutually orthogonal codes, different code sets are used for successive measurement cycles. For example, a code set can be selected randomly from a group of mutually orthogonal codes. This reduces the probability, in a context of interference of signals from radar sensors of two vehicles that are using the same code group, that the vehicles are simultaneously using the same coding.

To further reduce the effect of external interference, different values of at least one parameter of the frequency ramps of ramp sets 47, 47' can be used in successive measurement cycles. If different ramp slopes are used, for example, this increases the probability that an interfering signal will have a different ramp slope than the signal of the own radar sensor. The energy of the interfering signal is then distributed over frequencies in the baseband signal, and produces a noise background in the useful signal. Different durations or numbers of ramps in the ramp sets, and/or different center frequencies, can also be used, for example.

Whereas in the examples described above, phase modulation and phase demodulation are each accomplished using the same code (corresponding to a "matched filter" approach), it is also conceivable instead to use for phase demodulation a code $f_m$ or a code set $f_{m1}$, $f_{m2}$ that correlates with but is not identical to the code $C_m$, where the code set $f_{m1}$, $f_{m2}$ satisfies the condition of code set orthogonality with the at least one further code set $C_q$. This is indicated in FIG. 1, FIG. 3, and FIG. 8 respectively with dashed lines. In accordance with a "mismatched filter" approach, for example, the codes $f_{m1}, \ldots, f_{mQ}$ corresponding to a linear filter, for a number Q of codes of code set length L, are selected so that they meet the following conditions:

$$r_{fm1,Cm1}(0) + r_{fm2,Cm2}(0) + \ldots + r_{fmQ,CmQ}(0) = LQ, \text{ and} \quad (6)$$

$$r_{fm1,Cq1}(i) + r_{fm2,Cq2}(i) + \ldots + r_{fmQ,CqQ}(i) = 0 \text{ for all } i \quad (7).$$

A larger number of code sets is thus available.

Deviating from what has been described, the phase demodulation of the baseband signal can also be carried out before the first FFT, the phase demodulation being accomplished, for example, with the code sequences of a code set in separate channels.

A phase demodulation can also be accomplished with the code used in the transmitted signal, by the fact that the mixer mixes a received signal with the phase-modulated transmitted signal in order to generate the baseband signal.

Polyvalent codes can also be used. Binary codes, however, make possible a simple configuration in terms of circuit engineering, since a phase offset of 180° requires merely an inversion of the amplitude of the signal.

In the examples described, only a phase modulation (but no amplitude modulation) is carried out, so that the full signal strength can be utilized. A transmitted signal can, however, also be modulated with at least one sequence of frequency ramps that is phase- and amplitude-modulated in accordance with a code sequence.

Other orthogonal codes, for example Fourier codes, can also be used instead of the Hadamard codes described.

The above-described modulation method with frequency ramps having an identical center frequency $f_0$, as shown in FIG. 2 or FIG. 7, can be modified, for example, by changing the center frequency $f_0$ of the respective ramps within a ramp set or ramp sequence in accordance with a linear, higher-order frequency ramp with excursion $F_{slow}$ and ramp duration $T_{slow}$. Upon evaluation of the second FFT, the oscillation sampled by way of the sequence of ramps is then evaluated in order to identify the distance and relative speed; the oscillation contains, in addition to $f_v$, a frequency component $f_{d,slow} = 2dF_{slow}/(cT_{slow})$ dependent on the slope of the slow ramp. The frequency $f_v + f_{d,slow}$ then corresponds to an FMCW equation for the higher-order ramp.

The codes described have the advantage that they exist for any code lengths, and that the favorable correlation property is present for each code length. Great flexibility in the configuration of radar signals and radar systems is thus made available. Transmitted signals having a small number of ramps can be used, for example. This can result in a shorter transmission time and decreased demands in terms of memory and the data transfer rate of the evaluation unit.

Short, fast frequency ramps are used in the modulation methods described, so that the frequency spectra of the partial signals corresponding to the ramps are dominated by the distance-dependent frequency component. Modified methods are also conceivable, however, in order to enable an identification of values for v and d of an object. Ramps having a lower slope and/or a longer ramp duration, for example T=0.1 ms, can be used, for example; this also decreases demands in terms of sampling rate and/or frequency modulation. For example, based on a first Fourier analysis of a partial signal associated with a ramp, a functional relationship can be ascertained between v and d, for example in accordance with the FMCW equation. Information obtained from the second FFT can then be used, for example, to identify v and d, and/or values can be matched over multiple sequences of ramps having different ramp parameters.

For example, a respective first Fourier transform of the respective radar echoes of the frequency ramps of the transmitted signal can be accomplished; from at least one resulting one-dimensional spectrum, initial information in the form of a functional relationship between the distance d and the relative speed v of a localized object, associating different distances d with different relative speeds v, can be identified, such that the functional relationship can correspond, for example, to an FMCW equation for a respective frequency ramp; at least one second Fourier transform can be performed in a second dimension over the time course of the sequence of phase-demodulated one-dimensional spectra of the radar echoes of the successive frequency ramps; from at least one resulting spectrum of the second Fourier transform—or, in the case of the partial transmitted signals, from the summation of the resulting spectra of the second Fourier transform—further information regarding the relative speed and optionally the distance of the localized object can be obtained, such that the further information can be, for example, information in the form of a functional relationship in accordance with an FMCW equation for the higher-order, slow ramps of the center frequencies of the frequency ramps; and the distance d and relative speed v of the localized object can be identified based on a equalization (also called "matching") of the first information with the further information. For example, matching of the first information to the second information can be accomplished in consideration of an ambiguity of the second information identified by way of an unambiguity region for the relative speed v and optionally the spacing d. A method of this kind is also referred to as "multispeed" FMCW (MS-FMCW). Use of the orthogonal codes or code sets that satisfy the orthogonality condition has the particular advantage that very good suppression of self-interference and/or external interference can be achieved even with MS-FMCW modulation patterns having relatively few, comparatively long ramps. Good separability of the relative speeds v can thus be achieved even with a decreased A/D converter sampling rate.

Thanks to the sequential embodiment of the one-dimensional first and second Fourier transforms, the spectrum of the second Fourier transform represents a spectrum of a two-dimensional Fourier analysis, or a sum of two such spectra of the partial transmitted signals. The distance and relative speed are thus identified in particular on the basis of a value of the frequency spectrum of a two-dimensional Fourier analysis or based on a summation of such two-dimensional frequency spectra.

The first information can already be identified from a one-dimensional spectrum of a first Fourier transform. Based on a peak in the two-dimensional frequency spectrum it is also possible to identify the first information from the location of the peak in the first dimension of the frequency spectrum, and the further information can be identified from the location of the peak in the second dimension of the frequency spectrum.

Figure 13:
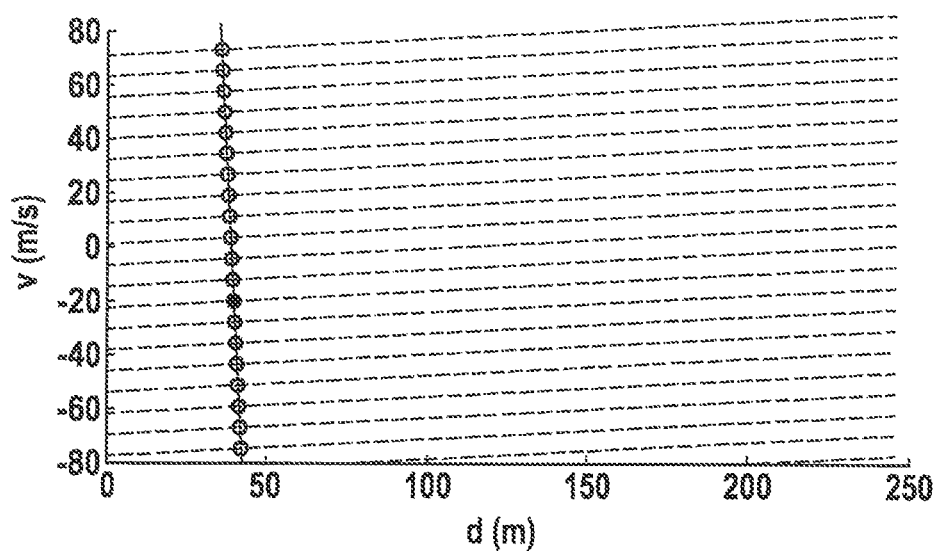
FIG. 13 is a distance/speed diagram to explain the evaluation of multi-speed FMCW radar signals.

FIG. 13 shows an example of a v-d diagram of first and second information of a ramp sequence from an MS-FMCW measurement, with a slow, higher-order frequency ramp of the center frequencies of the short ramps. Evaluation of a frequency spectrum of a frequency ramp yields, instead of a value for d, the line slightly inclined with respect to the vertical which corresponds to a linear relationship between the relative speed v and the distance d (first information). After phase demodulation, what results from the peak of the spectrum of the second FFT (or from the peak of the sum of the spectra of the second FFT) is a further (in this case, flat) dashed line that exhibits ambiguity. Matching of the first information with the second information, in consideration of the aforesaid ambiguity, yields potential value pairs (v, d) that are indicated by circles at the intersection points of the lines. Only one of these value pairs corresponds to the localized radar object (marked in FIG. 13). By using, in the same measurement cycle, at least one second ramp sequence having a different slope for the short ramps and/or a different slope for the higher-order ramp, it is possible to identify an unambiguous value pair (v, d) for the radar object by matching the intersection points that are obtained.

What is claimed is:

1. A radar system for a vehicle, comprising:
a first FMCW radar sensor;
at least one second FMCW radar sensor, each of the respective FMCW radar sensors having a controller for providing an operating mode in which a transmitted signal that encompasses a sequence of frequency modulation ramps is transmitted;
wherein a transmitted signal of the first FMCW radar sensor is phase-modulated in accordance with at least one first code sequence in that each frequency modulation ramp contains a phase position in accordance with an element of the code sequence which is associated with the frequency modulation ramp,
wherein the code sequence is orthogonal to a respective other code sequence in accordance with which a transmitted signal, encompassing a sequence of frequency modulation ramps, of the respective other radar sensor is phase-modulated,
wherein the transmitted signals of the first FMCW radar sensor and of the at least one second FMCW radar sensor are transmitted in a time-synchronized manner,
wherein a sequence of radar echoes of the frequency modulation ramps of the transmitted signal of the first FMCW radar sensor is phase-demodulated with a code sequence correlating with the first code sequence,
wherein at least one of a distance and a relative speed of a localized object is identified based on a value of a frequency spectrum of a Fourier analysis, in a first dimension respectively over sampled values of a radar echo of a frequency modulation ramp, and in a second dimension over the phase-demodulated sequence of radar echoes of the frequency modulation ramps of the transmitted signal of the first FMCW radar sensor, and
wherein orthogonal code sequences allows mutual interference to be suppressed in a context of time-synchronized phase modulation of two transmitted signals, so that self-interference within the radar system of the vehicle having the radar sensors can be suppressed.

2. The radar system of claim 1, wherein in the operating mode, the following are satisfied:

a respective first Fourier transform of the respective radar echo of the frequency modulation ramps of the transmitted signal is accomplished, the phase demodulation is performed on the one-dimensional spectra obtained for the radar echoes of the frequency modulation ramps, a second Fourier transform is executed in a second dimension over the time course of the sequence of phase-demodulated one-dimensional spectra of the radar echoes of the successive frequency modulation ramps, and at least one of a distance and a relative speed of a localized object is identified based on a peak in the two-dimensional frequency spectrum that is obtained.

3. The radar system of claim 1, wherein the magnitude of the at least one value of the frequency spectrum being proportional to the value of the complex cross-correlation function of the first code sequence and of the code sequence correlating therewith and used for phase demodulation, for a shift between the code sequences of zero.

4. The radar system of claim 1, wherein in the case of any component, contained in the radar echoes and deriving from the transmitted signal of the respective other radar sensor, that corresponds to a potential radar object, the component of the radar echo in the frequency spectrum being suppressed by the absence of correlation, due to orthogonality, between the respective other code sequence and the code sequence correlating with the first code sequence and used for phase demodulation.

5. The radar system of claim 1, wherein in the aforesaid operating mode the orthogonality of the code sequence with a respective other code sequence for which the complex cross-correlation function of the code sequences is equal to zero for a zero shift between the code sequences.

6. The radar system of claim 1, wherein in which, in the operating mode, the respective sequence of frequency modulation ramps is a sequence of frequency ramps whose respective center frequencies are modified over the sequence of frequency ramps in accordance with a higher-order frequency ramp.

7. The radar system of claim 1, wherein in which, in the operating mode:

based on at least one frequency spectrum of a Fourier analysis in one dimension over sampled values of a radar echo of a frequency modulation ramp of the transmitted signal, first information in the form of a functional relationship between the distance and the relative speed of a localized object is identified, the information associating different relative speeds with different distances, based on at least one frequency spectrum of a Fourier analysis in one dimension over the time course of the sequence of radar echoes of the successive frequency modulation ramps, further information is obtained regarding the relative speed and optionally distance of the localized object, and the distance and the relative speed of the localized object are identified based on a matching of the first information with the further information.

8. A radar system for a vehicle fleet, comprising:

a plurality of FMCW radar sensors for a respective vehicle of the vehicle fleet, each of the FMCW radar sensors having a controller for an operating mode in which, in one measurement cycle, at least two partial transmitted signals that each encompass a sequence of frequency modulation ramps are transmitted;

wherein the respective partial transmitted signal being phase-modulated in accordance with a code sequence of a code set, by the fact that the frequency modulation ramps each contain a phase position in accordance with an element of the code sequence which is associated with the frequency modulation ramp, wherein at least two associated code sequences of the code set are used for phase modulation for the at least two partial transmitted signals, wherein radar echoes of the partial transmitted signals are separately phase-demodulated and, for a respective partial transmitted signal, a frequency spectrum of a Fourier analysis is identified in a first dimension respectively over sampled values of a radar echo of a frequency modulation ramp, and in a second dimension over the phase-demodulated sequence of radar echoes of the successive frequency modulation ramps of the partial transmitted signal, wherein at least one of a distance and a relative speed of a localized object is identified based on a summation of the frequency spectra identified separately for the partial transmitted signals, wherein the controller of a radar sensor for a first vehicle is configured to use at least one first code set in the operating mode, wherein the controller of a radar sensor for at least one other vehicle of the vehicle fleet is configured to use at least one further code set in the operating mode, and wherein orthogonal code sequences allows mutual interference to be suppressed in a context of time-synchronized phase modulation of two transmitted signals, so that self-interference within the radar system of the vehicle having the radar sensors can be suppressed, and wherein the at least one first code set and the at least one further code set conforms to the code set orthogonality relationship such that a summation, executed over the number of code sequences for each code set, of the complex cross-correlation of the q-th code sequence of the first code set and the q-th code sequence of the further code set is equal to zero for any discrete shift between the code sequences of the first and the other code set, including a zero shift, where q is the summation index.

9. The radar system of claim 8, wherein in the case of any component, contained in the radar echoes of the radar sensor for the first vehicle and deriving from the transmitted signal, phase-modulated with at least one further code set, of a radar sensor for another vehicle, which component corresponds to a potential radar object, and wherein radar echoes of the potential radar object are suppressed in the context of summation as a result of the code set orthogonality relationship.

10. The radar system of claim 8, wherein in which the controller of the respective radar sensor is configured to use for phase demodulation, in the operating mode, a respective code set that correlates with the code set used for phase modulation of the partial transmitted signals but differs therefrom and satisfies the condition of code set orthogonality with the at least one further code set.

11. The radar system of claim 8, wherein in which the controller of the respective radar sensor is configured to transmit, in the operating mode, the sequences of frequency modulation ramps of the at least two partial transmitted signals in a mutually time-interleaved fashion, and to separate the radar echoes of the at least two partial transmitted signals based on a time-related association with the sequences of the frequency modulation ramps of the partial transmitted signals.

12. The radar system of claim 8, wherein:
in the operating mode of a respective radar sensor, separately for the partial transmitted signals:
a respective first Fourier transform of the respective radar echoes of the frequency modulation ramps of the partial transmitted signals is accomplished,
the phase demodulation is performed the one-dimensional spectra obtained for the radar echoes of the frequency modulation ramps,
a second Fourier transform is executed in a second dimension over the time course of the sequence of phase-demodulated one-dimensional spectra of the radar echoes of the successive frequency modulation ramps,
a summation, taking into account the phases, of the separately obtained two-dimensional spectra is accomplished, and
at least one of a distance and a relative speed of a localized object is identified based on a peak in the two-dimensional frequency spectrum that is obtained.

13. The radar system of claim 8, wherein the magnitudes of the values of the frequency spectra identified separately for the partial transmitted signals are each proportional to the magnitude of the complex cross-correlation function of the code sequence used for phase modulation of the respective partial transmitted signal and of the code sequence correlating therewith and used for phase demodulation, for a shift between the code sequences of zero.

14. The radar system of claim 8, wherein the controller of the respective radar sensor is configured to use, in the operating mode, at least one first code set in a first measurement cycle and at least one further code set in at least one further measurement cycle, and wherein the first code set and the at least one further code set conform to the code set orthogonality relationship.

15. The radar system of claim 8, wherein in which, in the operating mode, the respective sequence of frequency modulation ramps is a sequence of frequency ramps whose respective center frequencies are modified over the sequence of frequency ramps in accordance with a higher-order frequency ramp.

16. The radar system of claim 8, wherein in which, in the operating mode:
based on at least one frequency spectrum of a Fourier analysis in one dimension over sampled values of a radar echo of a frequency modulation ramp of the transmitted signal, first information in the form of a functional relationship between the distance and the relative speed of a localized object is identified, the information associating different relative speeds with different distances,
based on at least one frequency spectrum of a Fourier analysis in one dimension over the time course of the sequence of radar echoes of the successive frequency modulation ramps, further information is obtained regarding the relative speed and optionally distance of the localized object, and
the distance and the relative speed of the localized object are identified based on a matching of the first information with the further information.

* * * * *